Patented Feb. 25, 1930

1,748,897

UNITED STATES PATENT OFFICE

ALFRED OPPÉ, OF AACHEN, GERMANY

PROCESS FOR OBTAINING SOLID MIXTURES OF ALKALI-METAL HYPOCHLORITE AND ALKALI-METAL CHLORIDE

No Drawing. Application filed February 27, 1926, Serial No. 91,253, and in Germany March 23, 1925.

Hitherto alkali metal hypochlorite has been obtained technically only in dilute aqueous solutions either by treating alkali metal hydroxide or carbonate solutions with chlorine gas, or by electrolysis of alkali metal chlorides, or by double decomposition of hypochlorites of other metals and alkali metal salts.

Now, I have found that solid mixtures of alkali metal hypochlorite and alkali metal chloride may be obtained by spraying alkali hydroxide and treating this spray with chlorine gas. The resulting product is a moist mixture. This may be dried by a current of dry air or any other indifferent gas which is led through the reaction space.

One mode of operation consists in spraying a highly concentrated aqueous solution of alkali metal hydroxide (e. g. 50% NaOK) by means of chlorine gas through a sprinkler into an empty room. Another mode consists in blowing dust of solid alkali metal hydroxide into a room containing chlorine gas.

In order simultaneously to dry the moist products resulting in this way a sufficient amount of dry air or of any other indifferent gas is led through the room in which the chemical reaction is taking place. This drying gas may enter either through the sprinkler used for injecting or separately.

In order to prevent a rise of temperature dangerous to the hypochlorite, the reacting chemicals, the drying gas, and suitable parts of the plant, or any of these, may be cooled, in which case use may be made of the expansion of the originally compressed chlorine or drying gas.

I claim:

1. Process of preparing a solid mixture of alkali metal hypochlorite and alkali metal chloride which comprises treating with chlorine gas a finely divided alkali metal hydroxide in the form of a mist.

2. Process of preparing a dry solid mixture of alkali metal hypochlorite and alkali metal chloride which comprises subjecting a finely divided alkali metal hydroxide suspended in a gaseous drying medium to the action of chlorine gas.

In testimony whereof I affix my signature.

ALFRED OPPÉ.